(12) United States Patent
Turnquist et al.

(10) Patent No.: US 11,970,875 B2
(45) Date of Patent: Apr. 30, 2024

(54) MULTI-HEAD ADDITIVE PRINTING DEVICE FOR MANUFACTURING WIND TURBINE TOWER STRUCTURE

(71) Applicant: General Electric Company, Schenectady, NY (US)

(72) Inventors: Norman Arnold Turnquist, Carlisle, NY (US); James Robert Tobin, Simpsonville, SC (US); Krishna Ramadurai, Bangalore (IN); Krishna Prashanth Anandan, Chennai (IN)

(73) Assignee: GE Infrastructure Technology LLC, Greenville, SC (US)

( * ) Notice: Subject to any disclaimer, the term of this patent is extended or adjusted under 35 U.S.C. 154(b) by 363 days.

(21) Appl. No.: 17/280,242

(22) PCT Filed: Sep. 24, 2019

(86) PCT No.: PCT/US2019/052652
§ 371 (c)(1),
(2) Date: Mar. 26, 2021

(87) PCT Pub. No.: WO2020/068793
PCT Pub. Date: Apr. 2, 2020

(65) Prior Publication Data
US 2022/0049521 A1 Feb. 17, 2022

(30) Foreign Application Priority Data
Sep. 28, 2018 (IN) .............................. 201841036830

(51) Int. Cl.
*B33Y 10/00* (2015.01)
*B33Y 30/00* (2015.01)
(Continued)

(52) U.S. Cl.
CPC ............ *E04H 12/341* (2013.01); *B33Y 10/00* (2014.12); *B33Y 30/00* (2014.12);
(Continued)

(58) Field of Classification Search
CPC ....... E04H 12/12; E04H 12/341; F03D 13/20; F03D 13/22; E04G 21/0427;
(Continued)

(56) References Cited

U.S. PATENT DOCUMENTS

2004/0164436 A1* 8/2004 Khoshnevis ............ B28B 1/001
425/463
2009/0211173 A1 8/2009 Willey et al.
(Continued)

FOREIGN PATENT DOCUMENTS

CN 105625720 A 6/2016
CN 106088610 A 11/2016
(Continued)

OTHER PUBLICATIONS

PCT International Search Report & Opinion Corresponding to PCT/US2019/052652 dated Jan. 7, 2020.
(Continued)

*Primary Examiner* — Thu Khanh T. Nguyen
*Assistant Examiner* — Jamel M Nelson
(74) *Attorney, Agent, or Firm* — Dority & Manning, P.A.

(57) ABSTRACT

A system for manufacturing a tower structure of a wind turbine includes an additive printing device having a central frame structure with a platform and an arm member. The arm member is generally parallel to a longitudinal axis of the tower structure. The additive printing device also includes a plurality of robotic arms secured to the arm member of the central frame structure. Each of the robotic arms includes a printer head for additively printing one or more materials. The additive printing device further includes at least one
(Continued)

nozzle configured for dispensing a cementitious material. Moreover, the system includes one or more molds additively printed via the additive printing device of a polymer material. As such, the mold(s) define inner and outer wall limits of the tower structure. After the mold(s) are printed and solidified, at least one of the printer heads or the nozzle of the additive printing device is configured to dispense the cementitious material between the inner and outer wall limits of the tower structure.

9 Claims, 8 Drawing Sheets

(51) Int. Cl.
    *E04G 21/04*    (2006.01)
    *E04H 12/12*    (2006.01)
    *E04H 12/34*    (2006.01)
    *F03D 13/20*    (2016.01)

(52) U.S. Cl.
    CPC ......... *E04G 21/0427* (2013.01); *E04H 12/12* (2013.01); *F03D 13/20* (2016.05); *F05B 2230/21* (2013.01); *F05B 2240/912* (2013.01)

(58) Field of Classification Search
    CPC ........... F05B 2230/21; F05B 2240/912; B33Y 10/00; B33Y 30/00; B28B 1/001
    See application file for complete search history.

(56) References Cited

U.S. PATENT DOCUMENTS

| | | |
|---|---|---|
| 2012/0159785 A1 | 6/2012 | Pyles et al. |
| 2013/0295338 A1 | 11/2013 | Keating et al. |
| 2015/0300036 A1 | 10/2015 | Khoshnevis |
| 2017/0016244 A1* | 1/2017 | Keller ................. E04G 21/0463 |
| 2018/0037000 A1 | 2/2018 | Church |

FOREIGN PATENT DOCUMENTS

| | | | |
|---|---|---|---|
| EP | 2735674 B1 | 9/2015 | |
| FR | 3050744 A1 | 11/2017 | |
| KR | 101681544 B1 * | 12/2016 | ............ B21F 23/005 |
| WO | WO2016/055223 A1 | 4/2016 | |

OTHER PUBLICATIONS

Bassett et al., 3D Printed Wind Turbines Part 1: Design considerations and rapid manufacture potential, Science Direct, Sustainable Energy Technologies and Assessments, vol. 11, Sep. 2015, pp. 186-193. (Abstract Only—2 pages) https://doi.org/10.1016/j.seta.2015.01.002.

Gosselin et al., Large-Scale 3D Printing of Ultra-High Performance Concrete—A New Processing Route for Architects and Builders, Science Direct, Materials & Design, vol. 100, Jun. 15, 2016, pp. 102-109. (Abstract Only—3 pages) https://doi.org/10.1016/j.matdes.2016.03.097.

Link, 3D Printing Concrete: A 2,500-Square-Foot House in 20 Hours and an Eye on a Moon Shot, Redshift by Autodesk, Nov. 4, 2015, 10 Pages.

Tobia et al., Development and Characterization of a Droplet-Based Material Feed System for Multi-Material Projection Micro-Stereolithography, Rutgers University Libraries, New Brunswick, New Jersey, May 2016, 101 Pages.

EP Office Action EP application No. 19783847.7, dated Jun. 20, 2023, 6 pages.

* cited by examiner

MULTI-HEAD ADDITIVE PRINTING DEVICE FOR MANUFACTURING WIND TURBINE TOWER STRUCTURE

FIELD

The present disclosure relates in general to wind turbine towers, and more particularly to systems and methods for manufacturing wind turbine tower structures using a multi-head printer that allows for simultaneous printing of the tower reinforcement along with the concrete to result in a complete assembly on-site.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The wind turbine tower is generally constructed of steel tubes, pre-fabricated concrete sections, or combinations thereof. Further, the tubes and/or concrete sections are typically formed off-site, shipped on-site, and then arranged together to erect the tower. For example, one manufacturing method includes forming pre-cast concrete rings, shipping the rings to the site, arranging the rings atop one another, and then securing the rings together. As wind turbines continue to grow in size, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g. via bolting. Such methods, however, require extensive labor and can be time-consuming.

In view of the foregoing, the art is continually seeking improved methods for manufacturing wind turbine towers. Accordingly, the present disclosure is directed to methods for manufacturing wind turbine tower structures that address the aforementioned issues. In particular, the present disclosure is directed to methods for manufacturing wind turbine tower structures that utilizes simultaneous printing of the tower reinforcement along with the concrete to result in a complete assembly on-site.

BRIEF DESCRIPTION

Aspects and advantages of the invention will be set forth in part in the following description, or may be obvious from the description, or may be learned through practice of the invention.

In one aspect, the present disclosure is directed to a method for manufacturing a tower structure of a wind turbine. The method includes printing, via a first printer head of an additive printing device, at least a portion of one or more molds of the tower structure of the wind turbine of a polymer material on a foundation of the tower structure. The mold(s) defines inner and outer wall limits of the tower structure. After the portion of the mold(s) has solidified, the method includes providing, via a second printer head of the additive printing device, a cementitious material between the inner and outer wall limits of the tower structure while continuing to build up additional portions of the one or more molds with the polymer material. As the additional portions of the mold(s) continue to solidify, the method includes continuing to fill the additional portions of the one or more molds with the cementitious material until the tower structure is built up. Further, the method includes allowing the cementitious material to cure within the mold(s) so as to form the tower structure.

In one embodiment, providing, via the additive printing device, the cementitious material between the inner and outer wall limits may include additively printing, via the additive printing device, the cementitious material between the inner and outer wall limits. In alternative embodiments, providing, via the additive printing device, the cementitious material between the inner and outer wall limits may include dispensing, via at least one nozzle of the additive printing device, the cementitious material between the inner and outer wall limits.

In another embodiment, the additive printing device may include a plurality of robotic arms, with each of the robotic arms having a printer head for dispensing the polymer material and the cementitious material, respectively. In further embodiments, the method may include mounting a central frame structure of the additive printing device between the mold(s). Further, the central frame structure has a platform and an arm member extending generally perpendicular therefrom. Further, the robotic arms are secured to the arm member, with the arm member being generally parallel to a central, longitudinal axis of the tower structure. In such embodiments, the nozzle(s) of the additive printing device may be mounted to the arm member and may optionally be configured to move along a longitudinal axis of the arm member.

In additional embodiments, the method may further include translating the platform in a vertical direction so as to move the central frame structure and the plurality of robotic arms along the central, longitudinal axis of the tower structure during printing of the cementitious material. More specifically, in one embodiment, translating the platform in the vertical direction may include providing a movement mechanism configured to move the central frame structure within the tower structure and to allow for changes in a diameter of the tower structure as the additive printing device moves along the central, longitudinal axis to print multiple tower sections.

In several embodiments, the method may further include rotating one or more of the plurality of robotic arms around the central frame structure. In particular embodiments, a height of the additive printing device may be determined such that, once a first section of the tower structure is printed, the additive printing device can be moved to a second, vertical location to print a second section of the tower structure.

In further embodiments, the method may include printing, via the additive printing device, one or more guide structures for the plurality of robotic arms into the cementitious material and/or the polymer material. In further embodiments, the method may also include dispensing, via the additive printing device, an additional material into the cementitious material and/or the polymer material to form one or more reinforcement elements. The additional material may include, for example, a metal material, a composite material, a non-metal material, or combinations thereof. In another embodiment, the method may include providing an adhesive material between at least one of the cementitious material and the foundation, the cementitious material and the polymer material, the cementitious material and the metal material, or multiple layers of the cementitious, polymer, and/or metal materials. In several embodiments, the method may also include manually placing one or more reinforcement elements in at least one of the cementitious material or the polymer material before, during, or after printing and before curing.

In such embodiments, the reinforcement element(s) may include, for example, sensors, elongated cables or wires, helical cables or wires, reinforcing bars (hollow or solid), reinforcing fibers (metallic or polymeric), reinforcing metallic rings (circular, oval, spiral and others as may be relevant) or couplings, mesh, and/or any such structures as may be known in the art to reinforce concrete structures.

In another aspect, the present disclosure is directed to a method for manufacturing a cementitious structure. The method also includes printing, via a first printer head of an additive printing device, at least a portion of one or more molds of the structure of a polymer material on a foundation of the structure. The mold(s) defines inner and outer wall limits of the structure. After the portion of the one or more molds has solidified, the method includes providing, via a second printer head of the additive printing device, a cementitious material between the inner and outer wall limits of the structure while continuing to build up additional portions of the one or more molds with the polymer material. As the additional portions of the mold(s) continue to solidify, the method includes continuing to fill the additional portions of the mold(s) with the cementitious material until the structure is built up. Further, the method includes allowing the cementitious material to cure within the one or more molds so as to form the structure.

In yet another aspect, the present disclosure is directed to a system for manufacturing a tower structure of a wind turbine. The system includes an additive printing device, such as a 3D printer. The additive printing device includes a central frame structure having a platform and an arm member extending generally perpendicular therefrom. The arm member is generally parallel to a central, longitudinal axis of the tower structure. Further, the additive printing device includes a plurality of robotic arms secured to the arm member of the central frame structure. Each of the robotic arms includes a printer head for additively printing one or more materials. The material(s), for example, may include a polymer material, a cementitious material, and/or a metal material. Further, the additive printing device includes at least one nozzle configured for dispensing the cementitious material. Moreover, the system includes one or more molds additively printed via the additive printing device of the polymer material. As such, the mold(s) define inner and outer wall limits of the tower structure. Thus, at least one of the printer heads or the nozzle of the additive printing device is configured to dispense the cementitious material between the inner and outer wall limits of the tower structure.

It should be understood that the system may further include any of the additional features as described herein. For example, the system may further include one or more reinforcement elements for reinforcing the cementitious material. In another embodiment, the polymer material may include a biodegradable polymer that is configured to degrade/dissolve over time. In additional embodiments, the system may include a separate fluid transfer system for each of the one or more materials.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
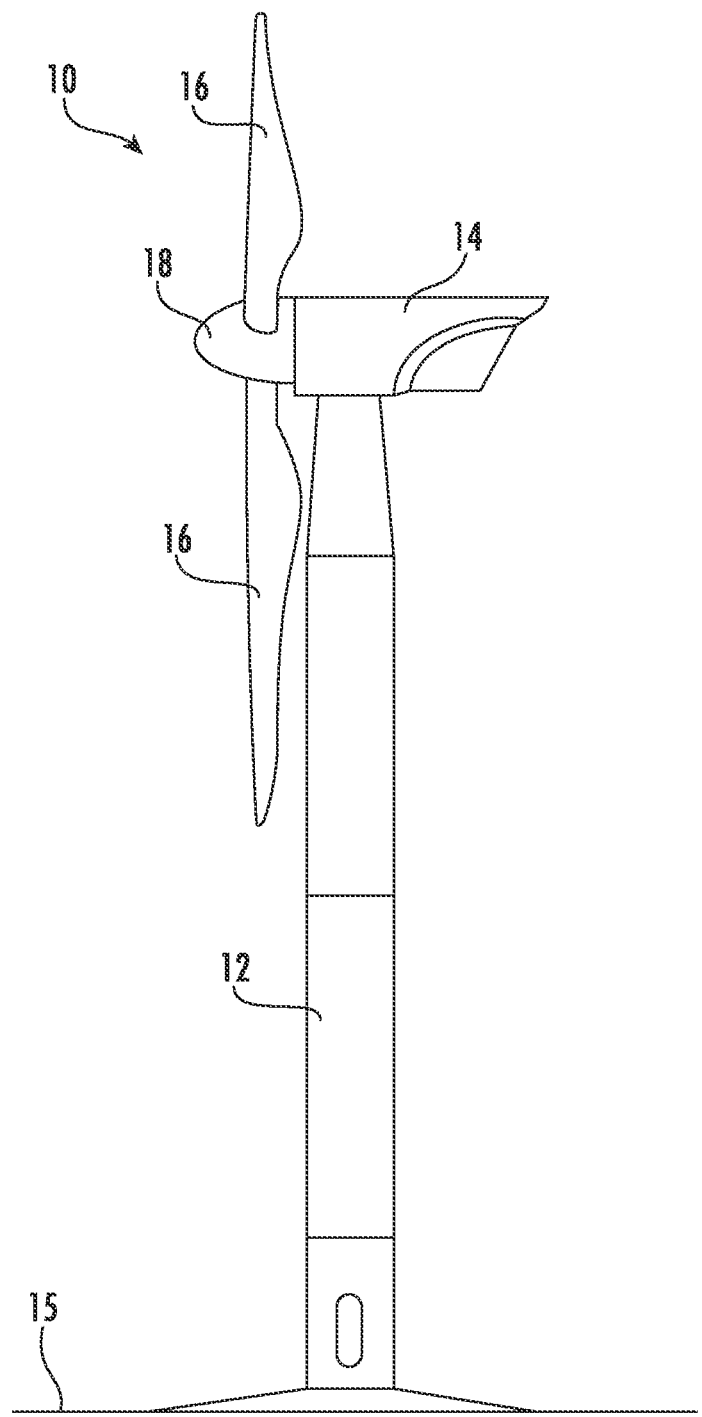
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for manufacturing wind turbine towers using automated deposition of cementitious materials via technologies such as additive manufacturing, 3-D Printing, spray deposition, extrusion additive manufacturing, concrete printing, automated fiber deposition, as well as other techniques that utilize computer numeric control and multiple degrees of freedom to deposit material. More specifically, methods of the present disclosure include simultaneous printing or inclusion of tower reinforcement elements along with concrete to result in a complete assembly on-site. In one embodiment, for example, methods of the present disclosure include using a polymer additive manufacturing technique to build inner and outer wall limits of the tower segments with a gap in between for the concrete. Such methods are achieved with a multi-head printer, where one printer head dispenses concrete and the other printer heads print the polymer material.

More specifically, the multi-head printer may include robotic arms each having a printer head mounted at its distal end, with the printer heads mounted on a central frame structure. As such, the robotic arms can swivel and move along the central frame structure. Structural reinforcements can also be added to the concrete during the printing process. Further, the length of the central frame structure can be as short as needed such that once a certain height of the 3D-printed concrete tower is set, the robotic arms can be transitioned to move along the concrete tower. One or more guide structures for the robotic arms can also be 3D printed in the polymer mold, which is subsequently filled with concrete. Thus, when the concrete is set, the polymer mold may be formed of a biodegradable polymer that is configured to degrade/dissolve over time so as to expose the guide structures. In additional embodiments, at least a portion of the polymer mold can be melted to expose the concrete guide structures, which can support the printer for building the tower from thereon. In addition, the robotic arms can be mounted on a moveable platform with at least one linkage mechanism to allow for the contracting diameter of the tower as the arrangement moves upwards. In another embodiment, one or more of the polymer printer heads can also be supplemented and/or replaced with a metal printer head to print metal reinforcements into the concrete. Alternatively, the rebar can be placed into the concrete, i.e. without the need for a separate printer head.

Thus, the methods described herein provide many advantages not present in the prior art. For example, as the polymer printing process is capable of solidifying into a structure faster than concrete, the molds described herein can be printed to allow larger amounts of concrete along with metal reinforcements to be injected into the mold(s). As such, methods of the present disclosure increase the manufacturing speed and provide a structural advantage over concrete alone. The mold(s) also provide environmental protection for the curing concrete. In other words, the mold(s) provide environmental protection for the curing concrete when the printing process is completed outside without requiring an additional structure to be erected onsite. Therefore, the mold(s) are configured to reduce and/or eliminate exposure to rain, snow, sleet, etc. A polymer printed mold also enables more of a draft angle to the tubular structure versus concrete printing alone.

Referring now to the drawings, FIG. 1 illustrates one embodiment of a wind turbine 10 according to the present disclosure. As shown, the wind turbine 10 includes a tower 12 extending from a foundation 15 or support surface with a nacelle 14 mounted atop the tower 12. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbine towers, but may be utilized in any application having concrete constructions and/or tall towers in addition to wind towers, including for example homes, bridges, tall towers and other aspects of the concrete industry. Further, the methods described herein may also apply to manufacturing any similar structure that benefits from the advantages described herein.

Figure 2:
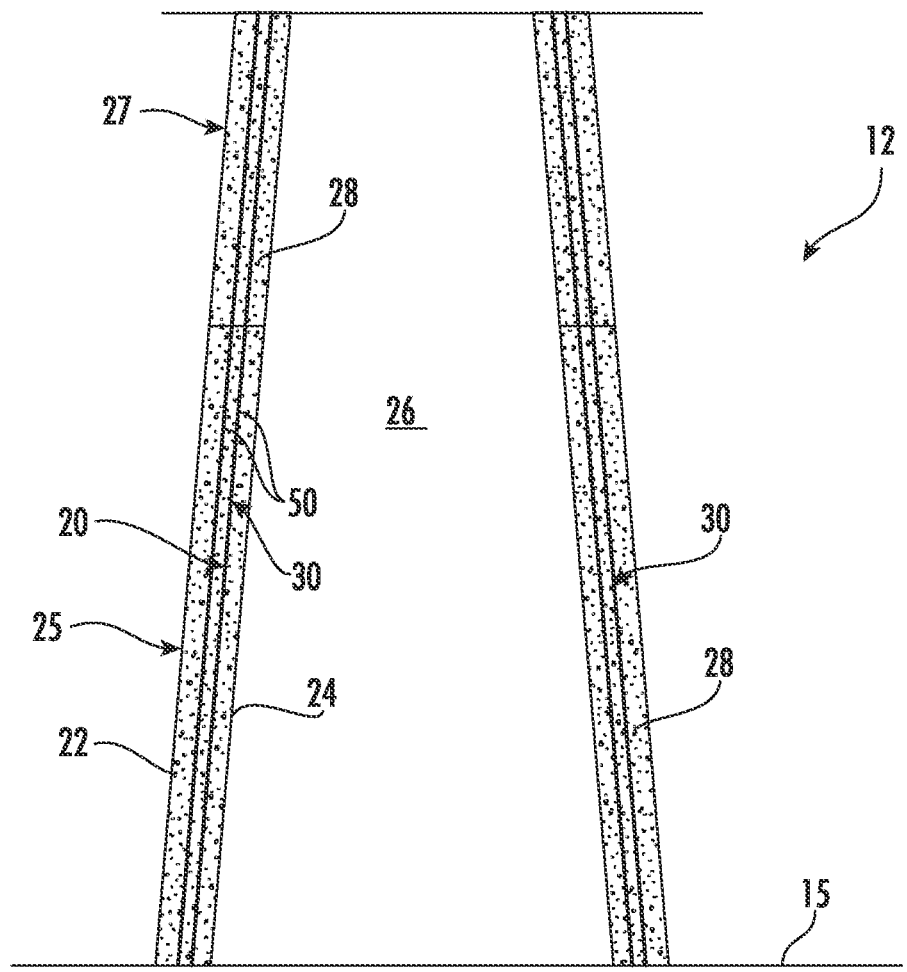
FIG. 2 illustrates a partial, cross-sectional view of one embodiment of a tower structure for a wind turbine manufactured with an additive printing device according to the present disclosure.

Referring now to FIG. 2, a partial, cross-sectional view of one embodiment of the tower structure 12 of the wind turbine 10 according to the present disclosure is illustrated. As shown, the tower structure 12 may be formed from a plurality of sections 25, 27. More specifically, as shown, the tower structure 12 has a first tower section 25 and a second tower section 27. In addition, the illustrated tower 12 defines a circumferential tower wall 20 having an outer surface 22 and an inner surface 24. Further, as shown, the circumferential tower wall 20 generally defines a hollow interior 26 that is commonly used to house various turbine components (e.g. a power converter, transformer, etc.) along different locations in the tower 12. In addition, as will be described in more detail below, the tower structure 12 is formed, at least in part, using additive manufacturing. Moreover, as shown, the tower structure 12 is formed of a cementitious material 28 that may be reinforced with one or more reinforcement elements 30. In particular embodiments, the reinforcement element(s) 30 described herein may include, for example, sensors, elongated cables or wires, helical cables or wires, reinforcing bars (hollow or solid), reinforcing fibers (metallic or polymeric), reinforcing metallic rings (circular, oval, spiral and others as may be relevant) or couplings, mesh, and/or any such structures as may be known in the art to reinforce concrete structures. As such, the reinforced tower structure 12 is configured to withstand wind loads that can cause the tower 12 to be susceptible to cracking.

In addition, as used herein, the cementitious material 28 may include any suitable workable paste that is configured to bind together after curing to form a structure. Suitable cementitious materials include, for example, lime or calcium silicate based hydraulically setting materials such as Portland cement, fly ash, blast furnace slag, pozzolan, limestone fines, gypsum, or silica fume, as well as combinations of these. In some embodiments, the cementitious material 28 may additionally or alternatively include non-hydraulic setting material, such as slaked lime and/or other materials that harden through carbonation. Cementitious materials may be combined with fine aggregate (e.g., sand) to form mortar, or with rough aggregate (sand and gravel) to form concrete. A cementitious material may be provided in the form of a slurry, which may be formed by combining any one or more cementitious materials with water, as well as other known additives, including accelerators, retarders, extenders, weighting agents, dispersants, fluid-loss control agents, lost-circulation agents, strength-retrogression prevention agents, free-water/free-fluid control agents, expansion agents, plasticizers (e.g., superplasticizers such as polycarboxylate superplasticizer or polynaphthalene sulfonate superplasticizer), and so forth. The relative amounts of respective materials to be provided in a cementitious material may be varied in any manner to obtain a desired effect.

Referring now to FIGS. 3-8, the present disclosure is directed to methods for manufacturing wind turbine towers via additive manufacturing. Additive manufacturing, as used herein, is generally understood to encompass processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers, but are also capable of printing curved shapes.

Figure 3:
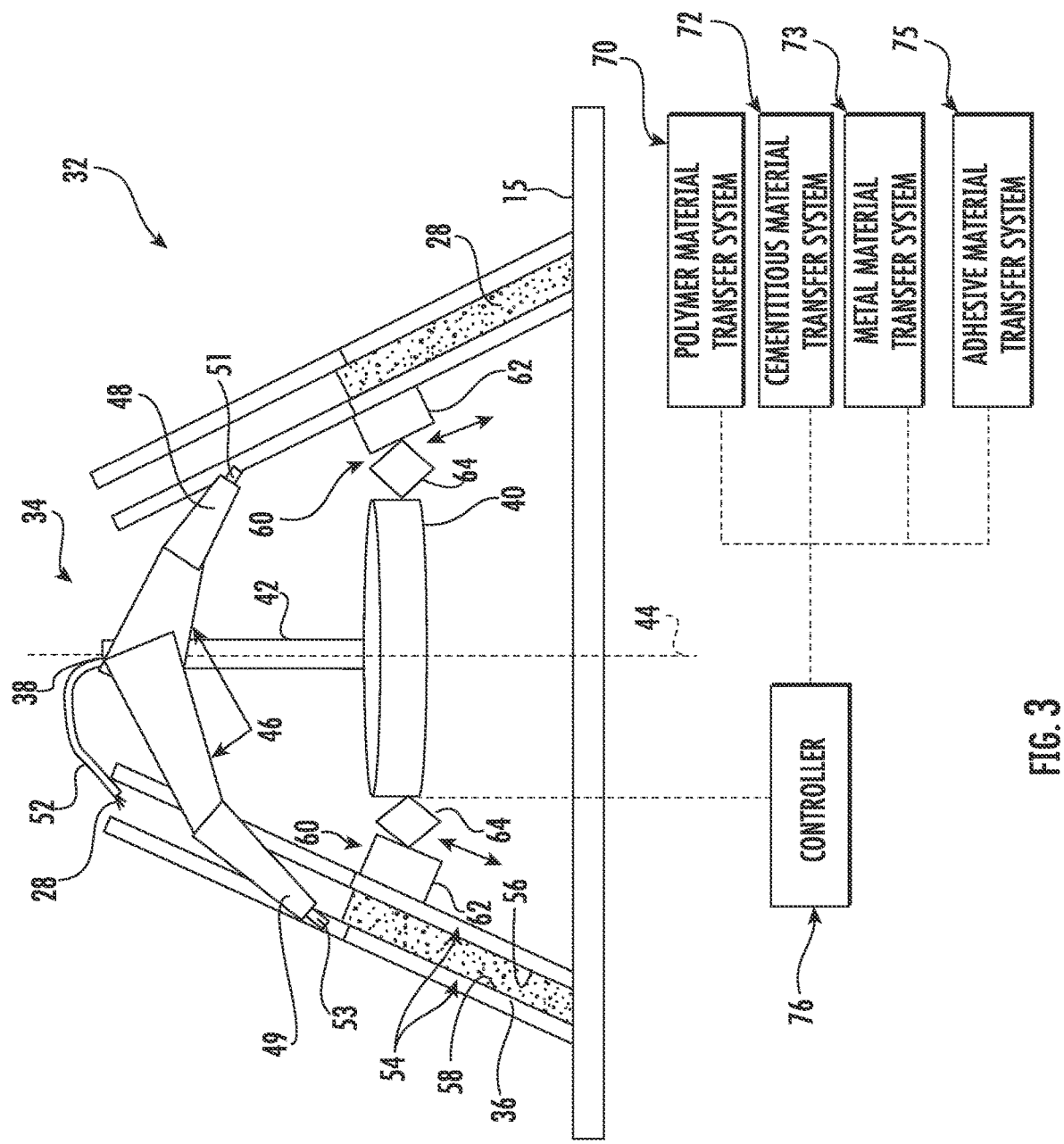
FIG. 3 illustrates a schematic diagram of one embodiment an additive printing device according to the present disclosure.

Referring particularly to FIG. 3, a schematic diagram of one embodiment of a system 32 for manufacturing the tower structure 12 of the wind turbine 10 is illustrated. As shown, the system 32 includes the additive printing device 34, such as a 3D printer. It should be understood that the additive printing device 34 described herein generally refers to any suitable additive printing device having one or more printer heads and/or nozzles for depositing material (such as a polymer material 36 and/or a cementitious material 28) onto a surface that is automatically controlled by a controller 76 to form an object programmed within the computer (such as a CAD file).

More specifically, as shown, the additive printing device 34 includes a central frame structure 38 having a platform 40 and an arm member 42 extending generally perpendicular therefrom. Further, as shown, the arm member 42 extends generally parallel to a central, longitudinal axis 44 of the tower structure 12. In addition, as shown, the additive printing device 34 includes a plurality of robotic arms 46 secured to the arm member 42 of the central frame structure 38. Moreover, as shown, each of the robotic arms 46 includes a printer head 48, 49 each having a print nozzle 51, 53 for additively printing one or more materials.

The material(s), for example, may include the polymer material 36, the cementitious material 28, a metal material 50, and/or an adhesive material 33. In addition, as shown, the robotic arms 46 are mounted to rotate or swivel around the arm member 42 of the central frame structure 38 during printing of the various materials. For example, in such embodiments, the robotic arms 46 may be mounted to a rotary bearing that is mounted to the central frame structure 38.

Figure 4A:
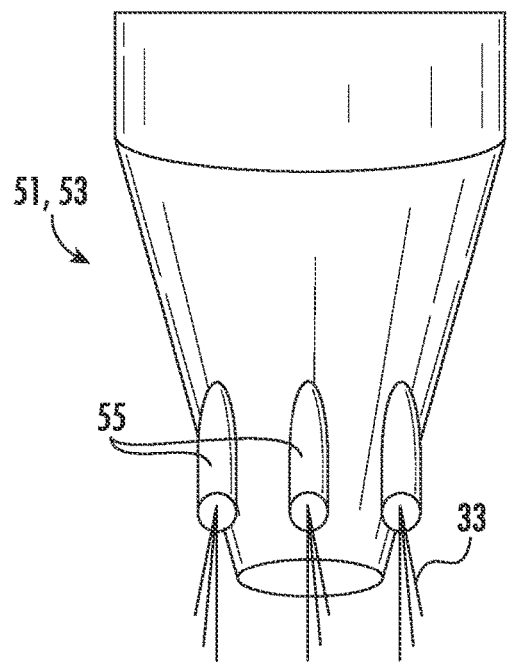
FIGS. 4A-4D illustrate perspective views of various embodiments of a print nozzle of an additive printing device according to the present disclosure.
Figure 4B:
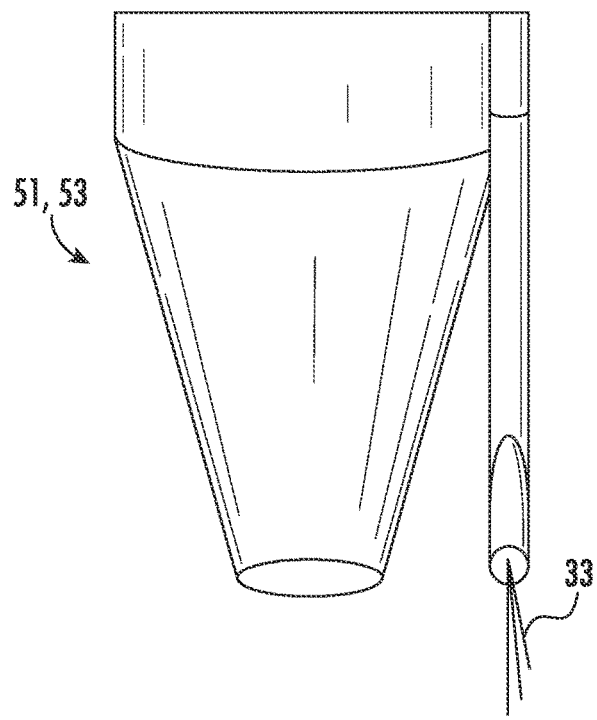
Figure 4C:
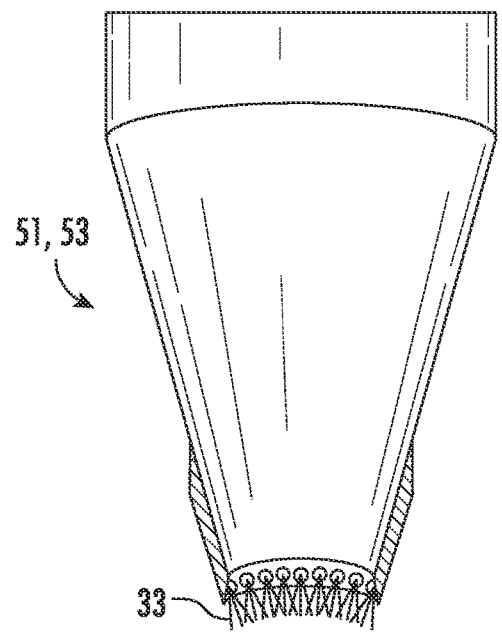
Figure 4D:
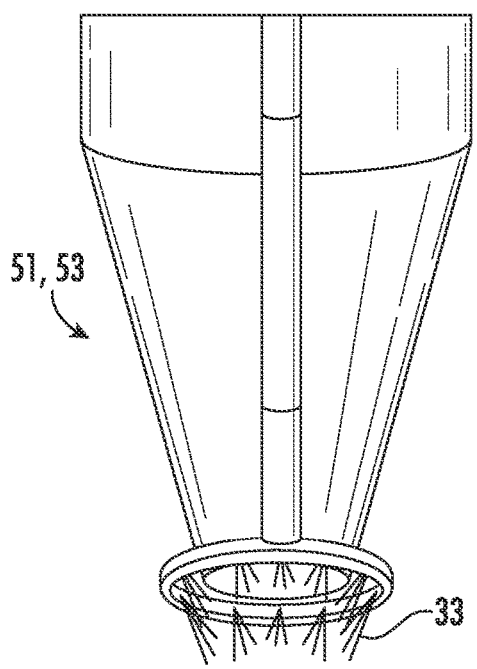

In addition, FIGS. 4A-4D illustrate perspective views of various embodiments of the print nozzles 51, 53 of the additive printing device 34 according to the present disclosure. More specifically, as shown, FIG. 4A illustrates one of the print nozzles 51, 53 having a plurality of integrated adhesive sprayers 55 for applying the adhesive material 33 to already-printed or as-printing cementitious material 28. FIG. 4B illustrates one of the print nozzles 51, 53 having a separate adhesive sprayer 55 for applying the adhesive material 33. In such embodiments, the separate adhesive sprayer 55 may contact or may not contact the print nozzle 51, 53. FIG. 4C illustrates a cut-away view of one of the print nozzles 51, 53 having a plurality of integrated adhesive sprayers 55 that are configured to apply the adhesive material 33 to a perimeter of the cementitious material 28 as it extrudes from the print nozzle 51, 53. FIG. 4D illustrates one of the print nozzles 51, 53 having a plurality of integrated adhesive sprayers 55 that are configured to spray the adhesive material 33 on the cementitious material 28 just after it comes out of the print nozzles 51, 53.

Further, the additive printing device 34 may include at least one injector 52 configured for dispensing the cementitious material 28. Moreover, the system 32 includes one or more molds 54 additively printed via the additive printing device 34 of the polymer material 36. It should be understood that the molds 54 described herein may be solid, porous, and/or printed with openings to inject the cementitious material 28. Thus, as shown, the mold(s) 54 define inner and outer wall limits 56, 58 of the tower structure 12. In addition, the central frame structure 38 may be mounted between the mold(s) 54. Thus, after at least at least a portion of the mold(s) 54 are printed and at least partially solidified, the printer heads 48, 49 and/or the nozzle 52 of the additive printing device 34 are configured to dispense the cementitious material 28 into the mold(s) 54 within the inner and outer wall limits 56, 58. In such embodiments, as little as a single layer of polymer material 36 may be printed and then filled with the cementitious material 28. In typical embodiments, the polymer material 36 solidifies much faster than the cementitious material 28; therefore, the cementitious material 28 can be printed/dispensed soon after a small amount of the polymer material 36 is laid down. In such embodiments, the residual heat from the cooling polymer material 36 (e.g. in the case of a thermoplastic) may also assist in the cementitious material 28 curing process. In other words, the cementitious material 28 can be printed after or simultaneously with the polymer material 36.

In specific embodiments, the additive printing device 34 may also be configured to print or place the metal material 50 into the cementitious and/or polymer materials 28, 36 to form one or more reinforcement elements 30 therein (such as any of those described herein). For example, in such embodiments, the printer heads 48, 49 described herein may print a liquid metal material 50 as is generally understood in the art, such as steel, titanium, or similar. Alternatively, the printer heads 48, 49 may be configured as a robotic pick-and-place-type device that can place the additional materials (e.g. such as steel or composite bars several meters in length or coiled steel cable hundreds of feet in length) into the cementitious and/or polymer materials 28, 36. In still further embodiments, one or more reinforcement elements 30 may be manually placed in the cementitious material 28 before, during, and after printing but before curing.

Referring still to FIG. 3, the platform 40 of the central frame structure 38 may be movable in a vertical direction so as to move the central frame structure 38 (and therefore the plurality of robotic arms 46) along the central, longitudinal axis 44 of the tower structure 12 during dispensing of the cementitious material 28. Thus, the additive printing device 34 can be linearly translated in the vertical direction for building up the tower structure 12. More specifically, as shown, the additive printing device 34 may include a movement mechanism 60 and/or a climbing mechanism. For example, in one embodiment, the movement mechanism 60 may include one or more motorized wheels 62 and at least one linkage mechanism 64 to allow for changes in a diameter of the tower structure 12 as the additive printing device 34 moves along the longitudinal axis 44 to print multiple tower sections. It should be further understood that the climbing mechanism may include any suitable climbing device. In yet another embodiment, the height of the additive printing device 34 may be determined such that, once a first section of the tower structure 12 is printed, the additive printing device 34 can be moved to a second, vertical location to print a second section of the tower structure 12. In another embodiment, the platform 40 of the central frame structure 38 may be fixed and the robotic arms 46 can be translated along the arm member 42 using different motion mechanisms.

Figure 5:
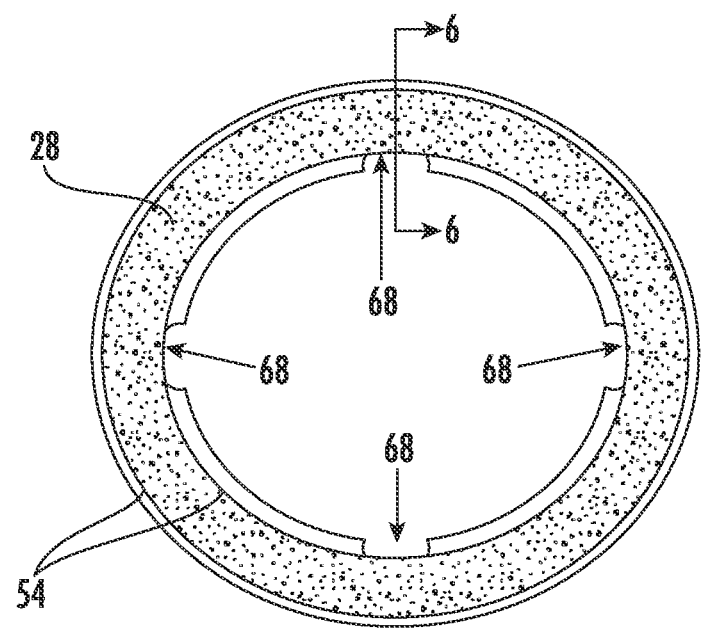
FIG. 5 illustrates a top view of one embodiment of a tower structure for a wind turbine manufactured according to the present disclosure.
Figure 6:
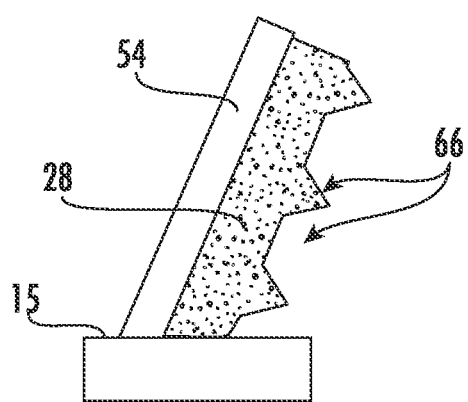
FIG. 6 illustrates a partial, side view of one embodiment of part of a tower structure for a wind turbine manufactured according to the present disclosure.

Referring now to FIGS. 5 and 6, various views of the system 32 for manufacturing the tower structure 12 of the wind turbine 10 at a wind turbine site are illustrated. FIG. 5 illustrates a top view of the tower structure 12 being formed within the molds 54. FIG. 6 illustrates a cross-sectional view of the tower structure of FIG. 6 along section line 6-6. As shown, the additive printing device 34 is further configured to print one or more guide structures 66 into the cementitious material 28. More specifically, in such embodiments, after the cementitious material 28 cures, one or more portions 68 of the mold(s) 54 can be melted to expose the guide structure(s) 66 so as to provide a support surface for the platform 40 of the central frame structure 38 such that the central frame structure 38 can be moved to the second, vertical location for printing the second section 27 of the tower structure 12.

Referring back to FIG. 3, the system 32 for manufacturing the tower structure 12 of the wind turbine 10 may also include a separate fluid transfer system 70, 72, 73, 75 for the polymer material 36, the cementitious material 28, the metal material 50, and the adhesive material 33, respectively (as well as any other materials used to manufacture the tower structure 12), the connections of which are not shown. However, it should be understood that each of the fluid transfer systems 70, 72, 73, 75 may include, at a minimum, a pump and a storage tank for the respective liquid material that is configured to store and transfer the respective liquid medium to the additive printing device 34.

Suitable polymer materials described herein may include, for example, a thermoset material, a thermoplastic material, a biodegradable polymer (such as a corn-based polymer system, fungal-like additive material, or an algae-based polymer system) that is configured to degrade/dissolve over time, or combinations thereof. As such, in one embodiment, the outer polymer mold may be biodegradable over time, whereas the inner polymer mold remains intact. In alternative embodiments, the outer and inner molds may be constructed of the same material.

In additional embodiments, the adhesive material 33 described herein may be provided between one or more of the cementitious material 28 and the foundation, the cementitious material 28 and the polymer material 36, the cementitious material 28 and the metal material 50, or multiple layers of the cementitious, polymer, and/or metal materials 28, 36, 50. Thus, the adhesive material 33 may further supplement interlayer bonding between materials.

The adhesive material 33 described herein may include, for example, cementitious material such as mortar, polymeric materials, and/or admixtures of cementitious material and polymeric material. Adhesive formulations that include cementitious material are referred to herein as "cementitious mortar." Cementitious mortar may include any cementitious material, which may be combined with fine aggregate. Cementitious mortar made using Portland cement and fine aggregate is sometimes referred to as "Portland cement mortar," or "OPC". Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

Exemplary polymeric materials that may be utilized in an adhesive formulation include may include any thermoplastic or thermosetting polymeric material, such as acrylic resins, polyepoxides, vinyl polymers (e.g., polyvinyl acetate (PVA), ethylene-vinyl acetate (EVA)), styrenes (e.g., styrene butadine), as well as copolymers or terpolymers thereof. Characteristics of exemplary polymeric materials are described in ASTM C1059/C1059M-13, Standard Specification for Latex Agents for Bonding Fresh To Hardened Concrete.

Figure 7:
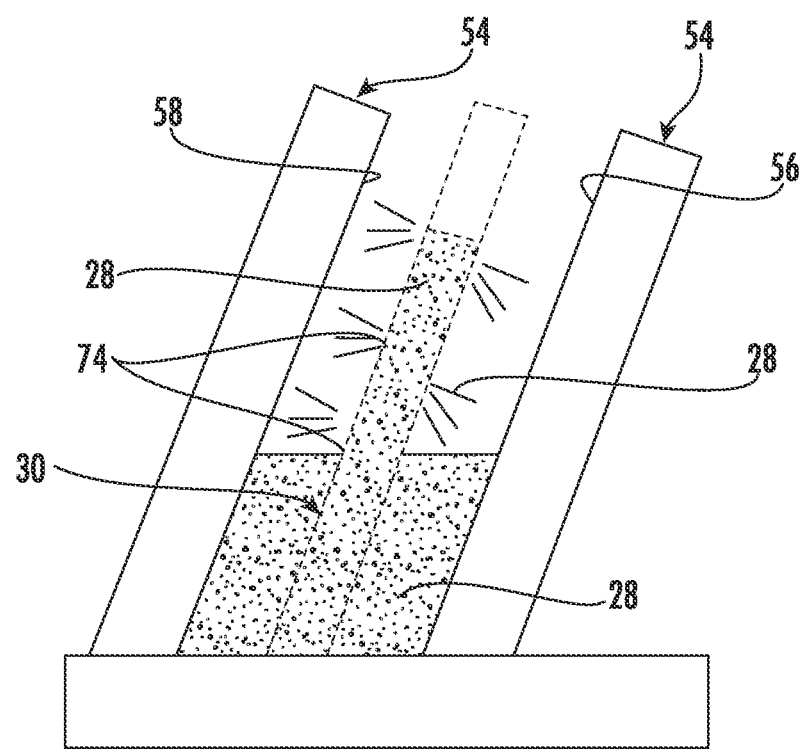
FIG. 7 illustrates a partial, side view of one embodiment of part of a tower structure for a wind turbine manufactured according to the present disclosure.

Referring now to FIG. 7, a partial, detailed view of another embodiment of the system 32 for manufacturing the tower structure 12 of the wind turbine 10 is illustrated. As shown, one of the reinforcement elements 30 is illustrated between the inner and outer wall limits 56, 58 as the cementitious material 28 is being dispensed therebetween. In addition, as shown, the illustrated reinforcement element 30 is hollow on the inside. More specifically, the reinforcement element 30 (typically assumed to be a tubular structure) can also have openings 74 on its surface positioned along the circumference at pre-determined heights. In such embodiments, the cementitious material 28 can be transported through the element 30 and pumped through the holes 74 of the reinforcement element 30 to fill the gap in between the mold structures 56, 58 (rather than using the printer heads 48, 49 and/or the injector 52). The various pumps of the fluid transfer systems 70, 72 described herein may also be configured to vary the pumping pressure to achieve dispensing at the desired height.

Figure 8:
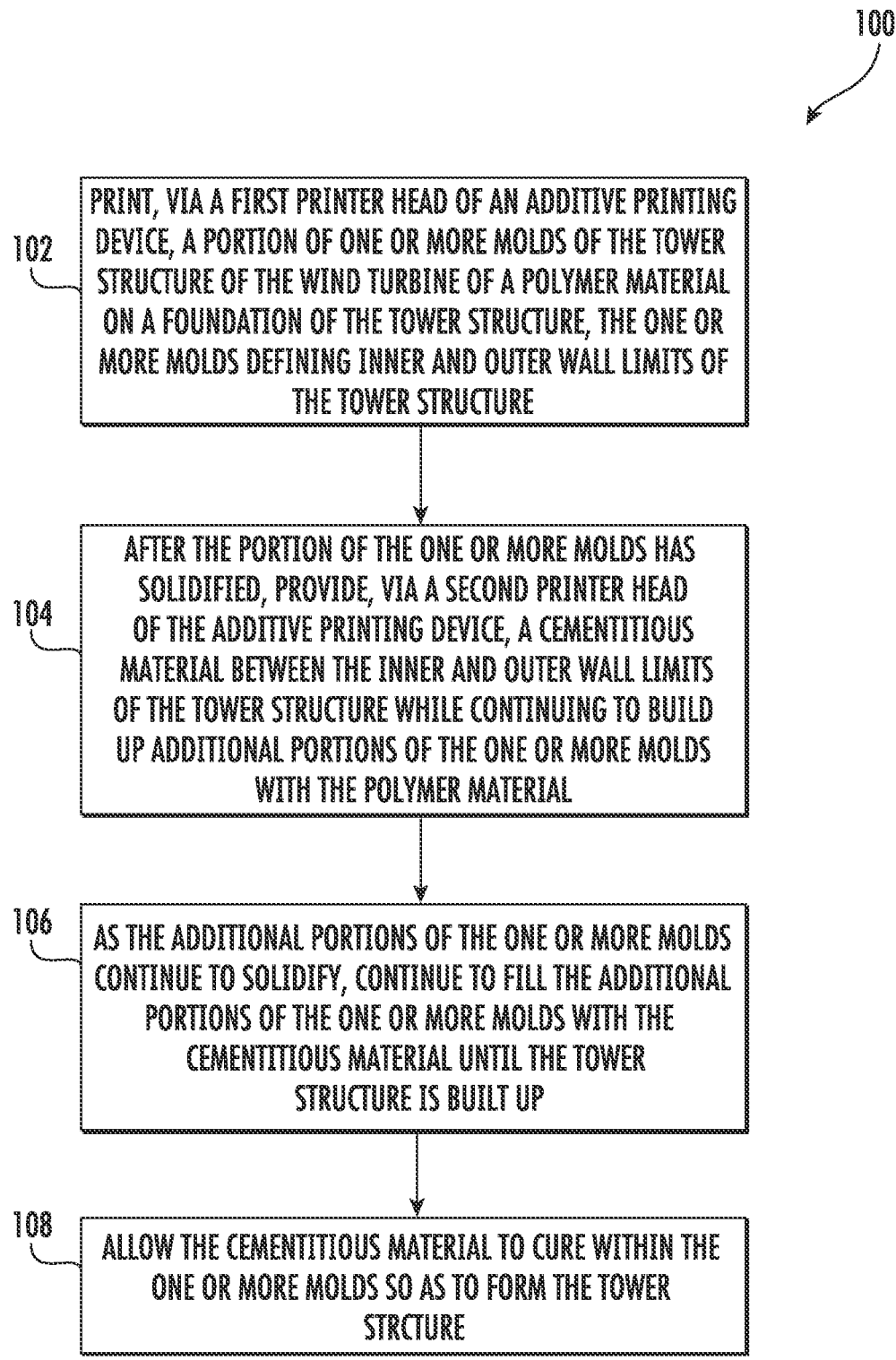
FIG. 8 illustrates a flow diagram of one embodiment of a method for manufacturing a tower structure of a wind turbine according to the present disclosure.

Referring particularly to FIG. 8, a flow diagram of one embodiment of a method 100 for manufacturing a tower structure of a wind turbine at a wind turbine site. In general, the method 100 will be described herein with reference to the wind turbine 10, tower structure 12, and system 32 shown in FIGS. 1-6. However, it should be appreciated that the disclosed method 100 may be implemented with tower structures having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include printing, via a first printer head 48 of the additive printing device 34, at least a portion of the mold(s) 54 of the tower structure 12 of the wind turbine 10 of the polymer material 36 on the foundation 15 of the tower structure 12. For example, in one embodiment, the first printer head 48 of the additive printing device 34 may be configured to dispense the polymer material 36 to build up the mold(s) 54 layer by layer on the foundation 15 of the wind turbine 10 (or any other suitable on-site location). In certain embodiments, the polymer material 36 may be printed using a pellet-fed extrusion system. Thus, as mentioned, the mold(s) 54 define inner and outer wall limits 56, 58 of the tower structure 12.

After the portion of the mold(s) 54 has solidified, as shown at (104), the method 100 may include providing, via a second printer head 49 of the additive printing device 34, a cementitious material 28 between the inner and outer wall limits 56, 58 of the mold(s) 54 while continuing to build up additional portions of the one or more molds 54 with the polymer material 36. As shown at (106), as the additional portions of the mold(s) 54 continue to solidify, the method 100 includes continuing to fill the additional portions of the mold(s) 54 with the cementitious material 28 until the tower structure 12 is built up. In such embodiments, the residual heat from the recently-printed polymer material 36 can help cure the cementitious material 28 faster.

In alternative embodiments, rather than printing the cementitious material 28, the injector 52 of the additive printing device 34 may simply inject or fill the mold(s) 36 with the cementitious material 28. In one embodiment, as shown, the additive printing device 34 may fill the mold(s) 54 from the top. Alternatively, after the molds are formed, one or more holes may be drilled into the sides thereof and the cementitious material 28 may be pumped into the holes at various heights either continuously or at frequent intervals to prevent excessive head pressure from building up. In addition, as shown at (106), the method 100 may include allowing the cementitious material 28 to cure within the mold(s) 54 so as to form the tower structure 12.

Figure 9:
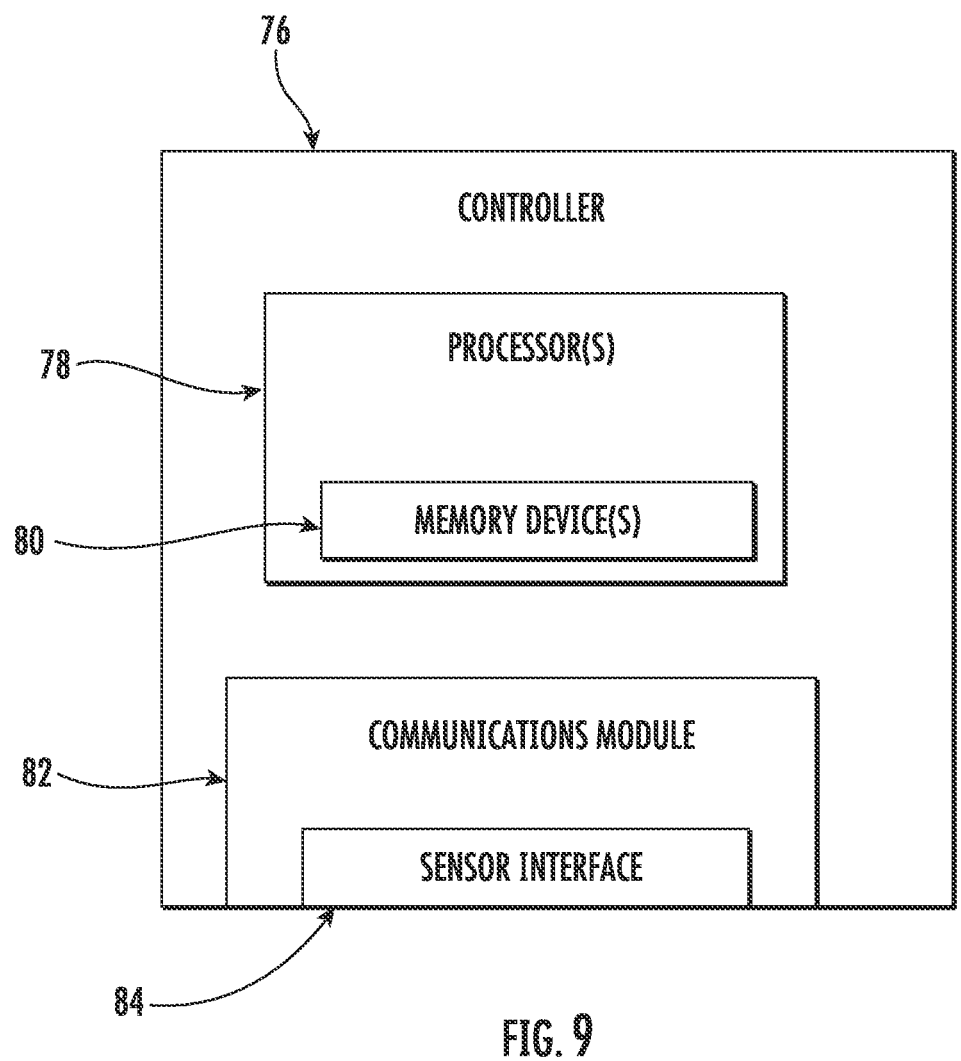
FIG. 9 illustrates a block diagram of one embodiment of a controller of an additive printing device according to the present disclosure.

Referring now to FIG. 9, a block diagram of one embodiment of the controller 76 of the additive printing device 34 is illustrated. As shown, the controller 76 may include one or more processor(s) 78 and associated memory device(s) 80 configured to perform a variety of computer-implemented functions (e.g., performing the methods, steps, calculations and the like and storing relevant data as disclosed herein). Additionally, the controller 76 may also include a communications module 82 to facilitate communications between the controller 76 and the various components of the additive printing device 34. Further, the communications module 82 may include a sensor interface 84 (e.g., one or more analog-to-digital converters) to permit signals transmitted from one or more sensors (not shown) to be converted into signals that can be understood and processed by the processors 78. It should be appreciated that the sensors may be communicatively coupled to the communications module 82 using any suitable means.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 78 is also configured to compute advanced control algorithms and communicate to a variety of Ethernet or serial-based protocols (Modbus, OPC, CAN, etc.). Additionally, the memory device(s) 80 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 80 may generally be configured to store suitable computer-readable instructions that, when implemented by the processor(s) 78, configure the controller 76 to perform the various functions as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A method for manufacturing a tower structure of a wind turbine, the method comprising:
    printing, via a first printer head of an additive printing device, at least a portion of one or more molds of the tower structure of the wind turbine of a polymer material on a foundation of the tower structure, the one or more molds defining inner and outer wall limits of the tower structure;
    after the portion of the one or more molds has solidified, providing, via a second printer head of the additive printing device, a cementitious material between the inner and outer wall limits of the tower structure while continuing to build up additional portions of the one or more molds with the polymer material;
    as the additional portions of the one or more molds continue to solidify, continuing to provide the additional portions of the one or more molds with the cementitious material until the tower structure is built up;
    providing an additional material in at least one of the cementitious material or the polymer material to form one or more reinforcement elements;
    providing an adhesive material between at least one of the cementitious material and the foundation, the cementitious material and the polymer material, the cementitious material and the additional material, or multiple layers of the cementitious material or the polymer material; and
    allowing the cementitious material to cure within the one or more molds so as to form the tower structure.

2. The method of claim 1, wherein providing, via the additive printing device, the cementitious material between the inner and outer wall limits further comprises at least one of additively printing, via the additive printing device, the cementitious material between the inner and outer wall limits or dispensing, via at least one nozzle of the additive printing device, the cementitious material between the inner and outer wall limits.

3. The method of claim 1, wherein the additive printing device comprises a plurality of robotic arms, each of the robotic arms comprising the first and second printer heads for printing the polymer material and providing the cementitious material, respectively.

4. The method of claim 3, further comprising mounting a central frame structure of the additive printing device between the one or more molds, the central frame structure having a platform and an arm member extending generally perpendicular therefrom, the plurality of robotic arms being secured to the arm member, the arm member being generally parallel to a central, longitudinal axis of the tower structure.

5. The method of claim 4, comprising translating the platform in a vertical direction so as to move the central frame structure and the plurality of robotic arms along the central, longitudinal axis of the tower structure during providing of the cementitious material.

6. The method of claim 5, wherein translating the platform in the vertical direction further comprises providing a movement mechanism configured to move the central frame structure within the tower structure and to allow for changes in a diameter of the tower structure as the additive printing device moves along the central, longitudinal axis to print multiple tower sections.

7. The method of claim 4, comprising rotating one or more of the plurality of robotic arms around the central frame structure.

8. The method of claim 1, wherein a height of the additive printing device is determined such that, once a first section of the tower structure is printed, the additive printing device can be moved to a second, vertical location to print a second section of the tower structure.

9. The method of claim 8, comprising printing, via the additive printing device, one or more guide structures for the plurality of robotic arms into at least one of the cementitious material or the polymer material.

* * * * *